UNITED STATES PATENT OFFICE

BELA DORNER, OF BUDAPEST, HUNGARY

PROCESS FOR DERIVING HIGH-GRADE CELLULOSE FROM COTTONSEED HULLS

No Drawing. Application filed October 26, 1929. Serial No. 402,807.

This invention relates to a process for making high grade cellulose from the waste products of the cotton industry such as cottonseed hulls. The term "cottonseed hull" as I employed it herein refers to the hull of the cottonseed to which the fibrous material (filamentous cotton) consisting of short fine threads of about 1 to 5 millimeters in length are attached.

It is well known fact that cellulose containing materials, as well as cellulose itself, (wood, cotton, etc.) are hygroscopic and that consequently these materials absorbs moisture from the air. The moisture which the said materials contain in an air dry state is more or less constant and this accounts for the fact that cellulose and cellulose containing materials are elastic and difficult to chop and to pulverize.

It is also a well known fact that hygroscopic moisture can be removed as well from cellulose as from cellulose containing materials, such as cottonseed hulls, by drying at a temperature of over 103° to 105° C. Parallel to drying, the physical properties of the material undergo a change, in view of which, cottonseed hulls, in an absolutely water free condition, are more brittle and can be also more conveniently pulverized.

Based upon the said physical properties of the cottonseed hull, my present process enables the fibrous material to be separated from the seed hull. I have found that the grinding of the cottonseed hull or the chopping of same by any other means can be carried through even more conveniently if the rigidity or brittleness of the hulls is increased before drying by saturating them with a solution of certain salts such as mineral or non-mineral salts. As an example of mineral salts I may employ sodium chloride, sodium sulfate, potassium sulfate, potassium chloride, and many others; and as an example of non-mineral salts I may use the salts of acetic acid and oxalic acid. Of course, it will be understood that I am not to be confined to the use of these specific salts enumerated above since any one skilled in the art will know of many other salts that may be advantageously employed in my invention. The result I desire to procure is merely a physical result and not a chemical change.

I will now describe my process in accordance with the way in which it has been put by me into practical operation. The cottonseed hulls supplied by the cotton industry with all kinds of impurities have to be soaked in water, either hot or cold, until they have absorbed the maximum quantity of water and consequently have become soft and considerably increased in volume, i. e., swollen. The limit of absorption is reached ordinarily within a few hours.

The hulls usually contain a great deal of fine dust. Therefore, it is advisable to change the soaking water a few times; in this way the material not only becomes freed from all kinds of dirt but at the same time certain water soluble substances are being eliminated which would otherwise undesirably color the cellulose.

We add to the raw material that has become in this way entirely swollen a water soluble salt, conveniently ordinary salt or a solution of ordinary salt. Assuming that ordinary salt is employed the concentration of the solution may vary within very broad limits. It is only for the sake of a concrete instance that I suggest the practical percentage of the salt of the water solution as being 6 to 8 percent. The raw material is soaked in this solution as long as the solution penetrates by diffusion into the cells of the hull. By examining such hulls under the microscope we find that the hulls to which the fibrous material or filamentous cotton is still adhering show swollen, hollow, porous cells, the holes of which, in such a swollen state, are filled with a solution of ordinary salt. The saturation with normal salt by diffusion is ordinarily completed within a few hours. On a commercial scale, however, the hulls may be soaked for any convenient time varying from a few hours to some days as the case may require. The cell particles saturated with the salt solution may be freed from the superfluous liquid in any convenient way, either by pressing or by using a centrifuge and this raw material should be dried as quickly as possible by the use of hot air and exhausters. The drying may take place at a temperature of 103° to 105° C. After the drying has been completed an absolutely dry product has been again obtained.

At this stage of the process the hulls are saturated with normal salt and the filamentous cotton threads which adhere to the hulls show on their surfaces microscopic salt crystals and are extraordinarily brittle so that they may be easily ground having lost their hygroscopic water content.

In this absolutely dry state the hot material is allowed to cool off. In the cool state the brittleness will even more be increased. After the material has cooled off, care has to be taken to store or keep it in a space the air of which has been freed from moisture.

The material is then ground in a mill that is closed from the outer air by means of any well known disintegrating device, such as between toothed surfaces the distance between which can be regulated as desired. Before the grinding care is taken to cause the brittleness of the cotton threads to disappear or to reduce it to a minimum, while at the same time maintaining the brittleness of the hulls. In order to do this I introduce into the material, before it gets to the mouth of the grinding mill, air saturated with moisture. The result of this will manifest itself as follows: The whole material, i. e., both the filamentous cellulose threads and the hulls being hygroscopic, the cotton threads will absorb hygroscopic water more rapidly than the hulls and will lose their brittleness at the moment that they have absorbed the hygroscopic water because of the fact that the diameter of the threads is hundredths of a millimeter while the size of the hulls is 1 to 3 millimeters in diameter, i. e., there is a very substantial difference between the volume of the threads and that of the hulls.

After the raw material, prepared in the described way, gets into the mill the glasslike brittle hulls are ground into small particles, the threads become separated from the hulls but they do not become chopped since by recovering their elasticity they become bent between the grinding surfaces, i. e., they do not break.

The further separating procedure is a simple screening operation. First of all, the ground raw material is placed on screens of different mesh. The particles that have gone through the screens of equal mesh are subjected to a separation by air which is also a well known process. The threads fly in the air current at a longer distance than the hulls, since the surface of the threads in proportion to their mass is larger than the surface of the hulls in proportion to their mass. In this way the hulls or the particles of hulls become separated from the threads. These separated hulls and threads are collected and placed into water in order to dissolve the salt. The salt thus recovered can be reused or recirculated continuously for the purpose of further soaking. The filamentous threads so obtained can either be directly bleached in which case they can be used as a raw material for the paper industry, or in case a pulp of superior quality is required it may be placed in an autoclave and digested with caustic soda by any well known process and bleached afterwards. The digested cellulose will be of an exceptionally high quality since on the one hand the caustic soda has dissolved from it the non-cellulosic materials and, on the other hand, the particles of hull which may be present, though in an insignificant quantity, in the form of fine powder intermingled with the threads, become eliminated with the water after the material has been placed on the paper machine.

While I have described hereinabove my process when employing a salt solution, it is to be understood that salt solutions need not necessarily be employed. The result that I am aiming at being to increase the brittleness of the material to the maximum, I am achieving this result in the most advantageous way by using an ordinary salt solution but the the same result, although to a less satisfactory degree, can be achieved if I only free the material from the hygroscopic water without using the salt solution.

I claim:

1. The process of treating cottonseed hulls to recover the filamentous material therefrom which comprises removing the hygroscopic water from the cottonseed hulls rendering them dry and brittle, subjecting them to moist air for a period of time sufficient only to allow the filamentous material to reabsorb moisture without restoring any substantial moisture content to the hulls themselves, thereafter grinding the same to chop up the brittle hulls into particles without disrupting the filamentous material, separating the filamentous material from the hull particles, and recovering the filamentous material.

2. The process of treating cottonseed hulls to recover the filamentous cotton therefrom which comprises thoroughly drying the same rendering them dry and brittle, subjecting them to moisture for a period of time sufficient only to allow the filamentous cotton to reabsorb moisture to restore its elasticity, grinding the cottonseed hulls to reduce the hulls themselves to particles without disrupting the elastic filamentous cotton, then subjecting the ground material to an air current thereby separating the filamentous cotton from the hull particles.

3. The process of treating cottonseed hulls to recover the filamentous cotton therefrom which comprises soaking them in a liquid, thoroughly drying the cottonseed hulls to remove substantially all of their hygroscopic water content thereby rendering them brittle, subjecting the cottonseed hulls to moisture for a sufficient time only to allow the filamentous cotton to reabsorb sufficient moisture to restore elasticity to the filamentous threads, then grinding the cottonseed hulls to reduce the hulls themselves to particles without disrupting the filamentous threads, and separating the hull particles from the filamentous threads by subjecting the ground material to an air current whereby the hull particles are separated from the filamentous threads.

4. The process of treating cottonseed hulls to recover the filamentous cotton threads adhering thereto which comprises removing the water soluble materials and extraneous matter therefrom, drying the cottonseed hulls to remove therefrom substantially all of the hygroscopic water thereby rendering them dry and brittle, subjecting the same to moisture for a period of time sufficient only to allow the filamentous cotton threads to reabsorb moisture to render them elastic without restoring any substantial moisture content to the hulls, thereafter milling the cottonseed hulls to reduce the brittle hulls themselves to particles without disrupting the elastic filamentous cotton threads, and then separating the hull particles from the filamentous cotton threads.

5. The process of treating cottonseed hulls to recover the filamentous cotton therefrom which comprises soaking the cottonseed hulls in a salt solution, drying the same to remove therefrom substantially all of the hygroscopic moisture thereby rendering the hulls themselves and the filamentous threads brittle, thereafter subjecting the dry cottonseed hulls to moisture for a sufficient time only to allow the filamentous threads to reabsorb sufficient moisture to render them elastic without allowing the hulls themselves to reabsorb any substantial amount of moisture, thereafter grinding the cottonseed hulls to reduce the hulls themselves to particles without disrupting the filamentous threads, and subjecting the ground material to air currents whereby the filamentous cotton threads are separated from the hull particles.

6. The process of treating cottonseed hulls to recover the filamentous cotton threads therefrom which comprises soaking them in a solution of common salt, thereafter drying the cottonseed hulls to remove substantially all of the water therefrom thereby rendering the hulls themselves and filamentous cotton threads brittle, subjecting the same to moisture for a period of time sufficient only to restore hygroscopic moisture to the filamentous cotton threads to the exclusion of any substantial moisture content being restored to the hulls themselves, thereafter milling the cottonseed hulls to reduce the brittle hulls to particles without disrupting the elastic filamentous cotton threads, and thereafter separating the hull particles from the filamentous cotton threads by forced air separation.

In witness whereof, I have hereunto subscribed my name.

BELA DORNER.